United States Patent

Horseman et al.

(10) Patent No.: US 9,713,953 B2
(45) Date of Patent: Jul. 25, 2017

(54) POWERTRAIN MOUNT ASSEMBLY

(71) Applicant: Ford Global Technologies, LLC, Dearborn, MI (US)

(72) Inventors: Jon Horseman, Braintree (GB); Matthew David George Shynn, Colchester (GB); Peter Brook, South Woodham Ferrers (GB); Alan Thorpe, Harlow (GB); Michael Ross, Basildon (GB); Matt Sykes, Wickford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/217,327

(22) Filed: Jul. 22, 2016

(65) Prior Publication Data

US 2017/0036526 A1 Feb. 9, 2017

(30) Foreign Application Priority Data

Aug. 4, 2015 (GB) .................................. 1513778.9

(51) Int. Cl.
*B60K 5/12* (2006.01)

(52) U.S. Cl.
CPC .......... *B60K 5/1216* (2013.01); *B60K 5/1208* (2013.01)

(58) Field of Classification Search
CPC .......... B60K 5/00; B60K 5/1216; B60K 5/12
See application file for complete search history.

(56) References Cited

U.S. PATENT DOCUMENTS 7,673,891 B2 * 3/2010 Johns .................... B60G 11/12
280/124.17
8,403,097 B2 * 3/2013 Joly ......................... F16F 1/373
180/291
8,979,105 B2 * 3/2015 McCarthy .............. B60G 11/12
280/124.163

FOREIGN PATENT DOCUMENTS

| CN | 203032358 U | 7/2013 |
|----|-------------|--------|
| JP | 2002240574 A | 8/2002 |
| JP | 2009196512 A | 9/2009 |
| JP | 2014083944 A | 5/2014 |

OTHER PUBLICATIONS

Examination Report of Great Britain Patent Application No. 1513778.9, Feb. 22, 2016, 7 pages, United Kingdom Intellectual Property Office.

* cited by examiner

*Primary Examiner* — John Walters
*Assistant Examiner* — James Triggs
(74) *Attorney, Agent, or Firm* — Greg Brown; McCoy Russell LLP

(57) ABSTRACT

A powertrain mount assembly configured to connect a powertrain to a side rail of a vehicle frame structure, wherein the powertrain mount assembly comprises: a mounting bracket comprising a first side wall and a second side wall spaced apart from the first side wall, the mounting bracket being configured to receive a resilient member and a bracket arm between the first and second side walls, the bracket arm being connectable to the powertrain; and a first support bracket connectable to a surface of the side rail, wherein the first side wall of the mounting bracket is fastenable to the first support bracket and wherein the first support bracket is configured to be connected to the side rail at a location between the first and second side walls of the mounting bracket.

15 Claims, 3 Drawing Sheets

POWERTRAIN MOUNT ASSEMBLY

CROSS REFERENCE TO RELATED APPLICATION

This application claims priority to Great Britain Patent Application No. 1513778.9, filed Aug. 4, 2015, the entire contents of which are hereby incorporated by reference for all purposes.

TECHNICAL FIELD

The present disclosure relates to a mount assembly for motor vehicle powertrain, and particularly, but not exclusively, relates to a mount assembly comprising a mounting bracket and a support bracket to which the mounting bracket attaches. The mounting bracket and support bracket may be arranged such that a fastener connecting the mounting bracket to the support bracket is substantially horizontal when installed.

BACKGROUND

An engine, or power train, e.g. engine and transmission, is usually mounted into the front structure of a motor vehicle. In normal use, the front structure should be strong to resist large loads from engine movements and stiff so as to benefit ride and handling of the vehicle.

As shown schematically in FIG. 1, a suspension for a front, transversely mounted, motor vehicle power plant 1 may be arranged in an automotive frame structure 2 between two front side rails 2a, 2b. The motor vehicle power plant or powertrain refers to a block or unit comprising the engine and/or gearbox of the vehicle 5, but may also comprise further components of the vehicle drive train.

A respective resilient engine mount 4a, 4b is arranged at each side rail 2a, 2b. The engine mounts 4a, 4b are arranged to receive a respective bracket arm 3a, 3b protruding from said motor vehicle power plant 1. The bracket arms 3a, 3b are typically received within a hydraulic unit or a rubber lined cavity arranged within a metal cup or housing. The engine mounts 4a, 4b are arranged to limit motor vehicle power plant 1 movement in a longitudinal direction of the vehicle, i.e. an X-direction, in a lateral direction of the vehicle, i.e. a Y-direction, and in a vertical direction, i.e. a Z-direction (not depicted).

FIG. 2 shows a previously-proposed mounting bracket 10, for attachment to one of the side rails 2a, 2b. The mounting bracket 10 comprises first and second side walls 12a, 12b between which there is a cavity 14 for receiving a resilient member and a bracket arm 3a, 3b (not shown in FIG. 2). Flanges 16a, 16b are provided at the bottom of the side walls 12a, 12b for coupling the mounting bracket 10 to a top surface 18 of the side rail 2a, 2b. Fasteners 20a, 20b in the form of bolts or studs may pass through the flanges 16a, 16b to fasten the mounting bracket to the side rail 2a, 2b. Support structures 22a, 22b may be provided beneath the side rail top surface 18 to provide a bore for the fastener to engage and/or to provide reinforcement to the side rail.

In a motor vehicle crash, the front structure and particularly the front side rails of the motor vehicle should collapse and crumple in a controlled manner to absorb the energy of the crash. In order for the crash energy to be absorbed without intrusion to the passenger compartment, the strength of the car needs to be progressive, i.e. the front structure needs to be weaker than the passenger compartment. A conflict therefore is that the front structure needs to be strong in everyday use but weaker in a crash, and this is particularly true of the engine mounting area.

The arrangement depicted in FIG. 2 adds stiffness to the side rails 2a, 2b. In particular, the mounting bracket 10 structurally reinforces the side rail 2a, 2b over the length of the side rail portion to which the mounting bracket is attached. Such reinforcement may be undesirable as it may affect the crumple performance of the side rail.

STATEMENTS OF INVENTION

According to an aspect of the present disclosure, there is provided a powertrain mount assembly configured to connect a powertrain to a side rail of a vehicle frame structure, e.g., chassis, wherein the powertrain mount assembly comprises:

a mounting bracket comprising a first side wall and a second side wall spaced apart from the first side wall, the mounting bracket being configured to receive a resilient member and a bracket arm between the first and second side walls, the bracket arm being connectable to the powertrain; and a first support bracket connectable to a surface of the side rail, wherein the first side wall of the mounting bracket is fastenable to the first support bracket and wherein the first support bracket is configured to be connected to the side rail at a location between the first and second side walls of the mounting bracket.

The first side wall may comprise a first opening for receiving a first fastener, e.g., such that the first fastener may be substantially horizontal when in the installed configuration. The first support bracket may comprise a first bore configured to receive the substantially horizontal first fastener.

The first side wall may comprise a substantially vertical first surface when in an installed configuration. The first opening may extend through the vertical first surface. The first opening and first bore may be arranged in the installed configuration such that the first fastener extends in a direction substantially parallel to a longitudinal axis of the vehicle frame structure. The vehicle frame structure longitudinal axis may be parallel to a longitudinal axis of a vehicle comprising the vehicle frame structure. In other words, the first fastener may extend in a fore-aft direction.

The first support bracket may be configured to connect to a top surface of the side rail. The mounting bracket may be provided above a top surface of the side rail.

The first support bracket may comprise a bottom surface connectable to the surface, e.g. top surface, of the side rail. The first support bracket may comprise a side surface to which the mounting bracket may be fastened. The side surface may comprise the first opening for receiving the fastener. The side and bottom surfaces may be substantially perpendicular to one another. The first support bracket may be welded to the side rail.

The mounting bracket may comprise a flange connected to the second side wall. The flange may comprise a second opening extending through the flange for receiving a second fastener to attach the mounting bracket to the side rail. The second fastener may extend into the side rail surface, e.g., the top surface. The flange may be substantially horizontal in the installed configuration. The second fastener may be substantially vertical in the installed configuration.

The powertrain mount assembly may further comprise a second support bracket connectable to the surface, e.g., top surface, of the side rail. The second side wall of the mounting bracket may be fastenable to the second support bracket. The second support bracket may be configured to be connected to the side rail at a location between the first and second side walls of the mounting bracket.

The second side wall may comprise a second opening for receiving a second fastener, e.g., such that the second fastener is substantially horizontal when in the installed configuration. The second support bracket may comprise a second bore configured to receive the substantially horizontal second fastener.

The second side wall may comprise a substantially vertical second surface when in the installed configuration. The second opening may extend through the vertical second surface. The second opening and second bore may be arranged in the installed configuration such that the second fastener may extend in a direction substantially parallel to a longitudinal axis of the vehicle frame structure.

The second support bracket may comprise a bottom surface connectable to the surface, e.g., top surface, of the side rail. The side support bracket may comprise a side surface. The side surface may comprise the second opening for receiving the fastener. The side and bottom surfaces may be substantially perpendicular to one another. The second support bracket may be welded to the side rail.

The mounting bracket may comprise a cavity for receiving the resilient member and bracket arm. The cavity may be provided between the first and second side walls.

The first and/or second fasteners may comprise a bolt or stud. The first and/or second fasteners may further comprise a nut. Alternatively or additionally, the first and/or second bores may be threaded.

A vehicle may comprise the above-mentioned powertrain mount assembly.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 3:
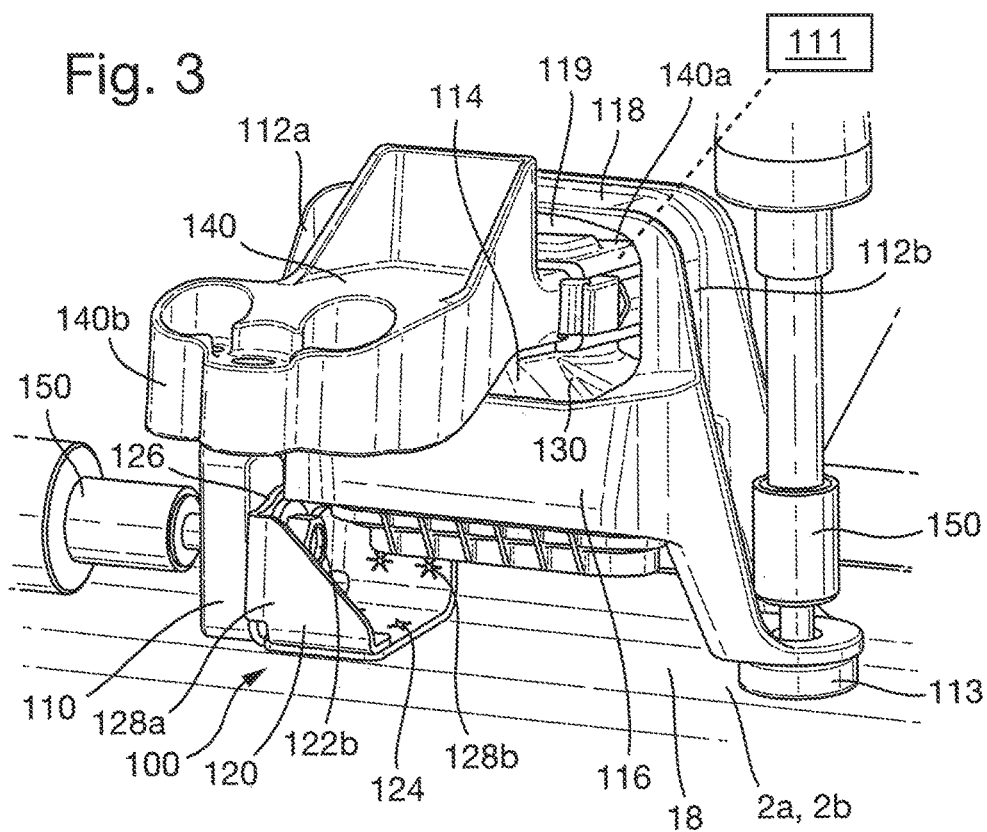
FIG. 3 shows a perspective view of a powertrain mount assembly according to an arrangement of the present disclosure.
Figure 4:
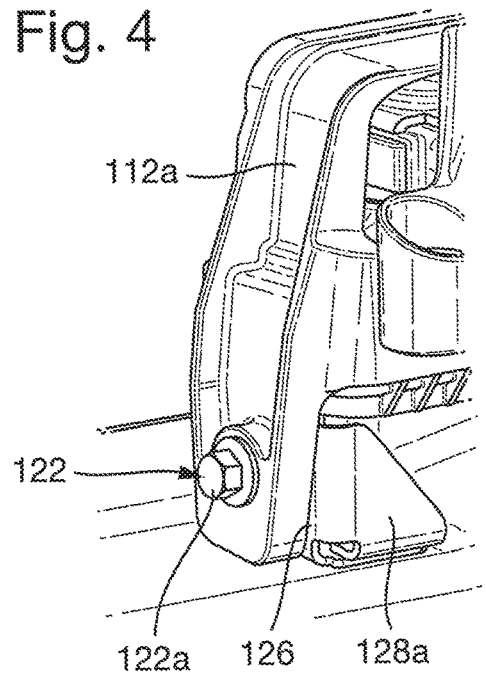
FIG. 4 shows a further perspective view of the powertrain mount assembly depicted in FIG. 3.

With reference to FIGS. 3 and 4, the present disclosure relates to a powertrain mount assembly 100. The powertrain mount assembly 100 comprises a mounting bracket 110 and a first support bracket 120. The mounting bracket 110 is fastenable to the first support bracket 120, e.g., by virtue of a nut and bolt assembly. The first support bracket 120 is connectable to a top surface 18 of a side rail 2a, 2b, e.g., by virtue of a weld. The mounting bracket 110 is configured to receive a resilient member 130, which in turn receives a bracket arm 140 that is connectable to the vehicle powertrain.

As mentioned above, the side rails 2a, 2b may form part of a frame structure for supporting a vehicle powertrain 111. The bracket 110 may be directly and mechanically rigidly coupled to the powertrain (e.g., engine, transmission, etc.) and/or indirectly mechanically rigidly coupled to the powertrain. The side rails 2a, 2b may extend in a direction substantially parallel to a longitudinal axis of the vehicle. In a particular example, the mounting bracket 110 and first support bracket 120 may be connected to the side rail 2b on a right hand side of the vehicle.

The mounting bracket 110 comprises a first side wall 112a and a second side wall 112b, which are spaced apart from one another. The first side wall 112a may be spaced apart from the second side wall 112b in a direction parallel to the longitudinal axis of the vehicle or side rail 2a, 2b. The first and second side walls 112a, 112b may extend in a generally vertical direction, e.g. upwards, from the top surface 18 of the side rail 2a, 2b. The first and second side walls 112a, 112b may be elongate.

The mounting bracket 110 defines a cavity 114 between the first and second side walls 112a, 112b in which the resilient member 130 may be received. A front wall 116 and a back wall (not visible in FIGS. 3 and 4) connect and extend between the first and second side walls 112a, 112b. The front wall 116 and back wall further define the cavity 114 for receiving the resilient member 130. In addition, a top wall 118 may connect and extend between the first and second side walls 112a, 112b. The top wall 118 may extend from top edges of the side walls 112a, 112b. By contrast the front wall 116 and back wall may extend from a point between top and bottom edges of the side walls 112a, 112b. A gap 119 may therefore exist between the top wall 118 and the front and back walls.

The resilient member 130 may be provided in the cavity 114 between the front wall 116 and back wall. The bracket arm 140 may extend through the gap 119 and connect with the resilient member 130 at a first end 140a of the bracket arm. A second end 140b of the bracket arm may be coupled to the powertrain of the vehicle. In this way the powertrain may be resiliently coupled to the side rail 2a, 2b of the vehicle frame structure.

The resilient member 130 may comprise a material with elastic properties, such as rubber or any other similar material. Additionally or alternatively, the resilient member 130 may comprise fluid, such as oil, arranged in a sealed unit so as to resiliently resist movement of the bracket arm 140 relative to the mounting bracket 110.

The first and second side walls 112a, 112b may extend below the front and back walls 116. As depicted in FIG. 4, the first side wall 112a extends substantially vertically, at least beneath the front and back walls 116. The first side wall 112a comprises an opening provided towards the bottom edge of the side wall 112a. The opening is configured to receive a nut and bolt assembly 122, which permits the first side wall 112a to be connected to the first support bracket 120. A bolt 122a of the nut and bolt assembly 122 extends in a substantially horizontal direction. A nut 122b of the nut and bolt assembly 122 may be provided against a surface of the first support bracket opposite the first side wall 112a so that the bolt and nut 122a, 122b may together clamp the mounting bracket 110 to the first support bracket 120. The nut 122b may be fixed, e.g., welded, to the first support bracket 120. As depicted in FIG. 3, a tool 150 may drive rotation of the bolt 122a relative to the nut 122b.

The first support bracket 120 may comprise a bottom wall 124 and an end wall 126. The bottom wall may be configured to engage the top surface 18 of the side rail 2a, 2b. The end wall 126 may be configured to engage the first side wall 112a of the mounting bracket 110. The end wall 126 may be substantially vertical and the bottom wall 124 may be substantially horizontal when installed. Accordingly, the bottom wall 124 and end wall 126 may be substantially perpendicular. Gusset plates or webs 128a, 128b may connect to respective edges of the bottom and end walls 124, 126 to provide reinforcement. The webs 128a, 128b may be substantially perpendicular to the bottom and end walls 124, 126. The end wall 126 may comprise an opening for receiving the bolt 122a of the nut and bolt assembly 122. As mentioned above, the first support bracket 120 may be welded to the side rail 2a, 2b, for example along edges of the bottom wall 124.

As shown in FIG. 3, the mounting bracket 110 comprises a flange 113 provided at the bottom edge of the second side wall 112b. The flange 113 is configured to interface with the top surface 18 of the side rail 2a, 2b. The flange 113 may be substantially perpendicular to at least a portion of the second side wall 112b. The flange 113 comprises an opening for receiving a bolt, which permits the flange to be fastened to the side rail 2a, 2b. The flange 113 and opening are arranged such that the bolt is substantially vertical when installed. A tool 150 may be used to rotate the bolt relative to the side rail. A nut or threaded bore (not shown) may be provided in the side rail 2a, 2b to receive the bolt.

As depicted the first support bracket 120 is provided adjacent to a surface of the first side wall 112a and is provided between the first and second side walls 112a, 112b. The mounting bracket 110 is connected to the side rail 2a, 2b by virtue of the first support bracket 120 and the flange 113. The axial spacing of these connections to the side rail 2a, 2b has been reduced thanks to the provision of the first support bracket 120 between the first and second side walls 112a, 112b. Accordingly, the length of the side rail 2a, 2b that has been stiffened by the presence of the mounting bracket 110 has been reduced in size. The crumple performance of the side rail 2a, 2b may therefore have been improved.

In an alternative arrangement (not depicted), the second side wall 112b and mounting bracket 110 may connect to a second support bracket which may be similar to the first support bracket 120. In this alternative arrangement the flange 113 is not required and the second side wall 112b may instead comprise an opening for receiving a nut and bolt assembly to fasten the second side wall to the second support bracket. In other words the second side wall 112b may mirror the first side wall 112a shown in FIGS. 3 and 4. The second support bracket may also mirror the first support bracket shown in FIGS. 3 and 4 and may be provided adjacent to the second side wall 112b at a location between the first and second side walls 112a, 112b. The second support bracket may also be welded to the side rail. With such an arrangement the axial spacing of the connections to the side rail 2a, 2b can be further reduced and the crumple efficiency of the side rail improved.

Figure 1:
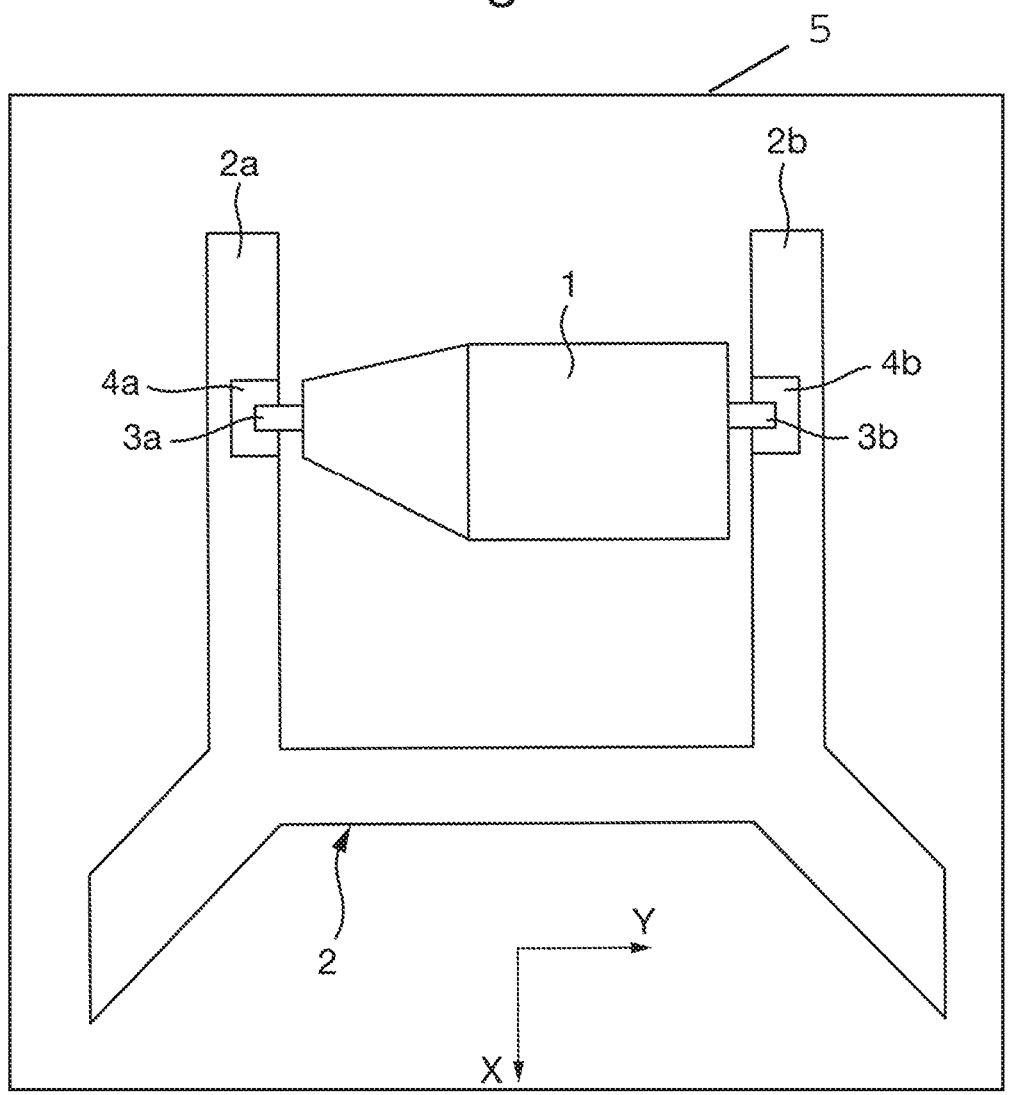
FIG. 1 is a schematic illustration of a suspension for a front, transversely mounted, motor vehicle power plant that is arranged in an automotive frame structure between two front side members prior to a front end collision.
Figure 2:
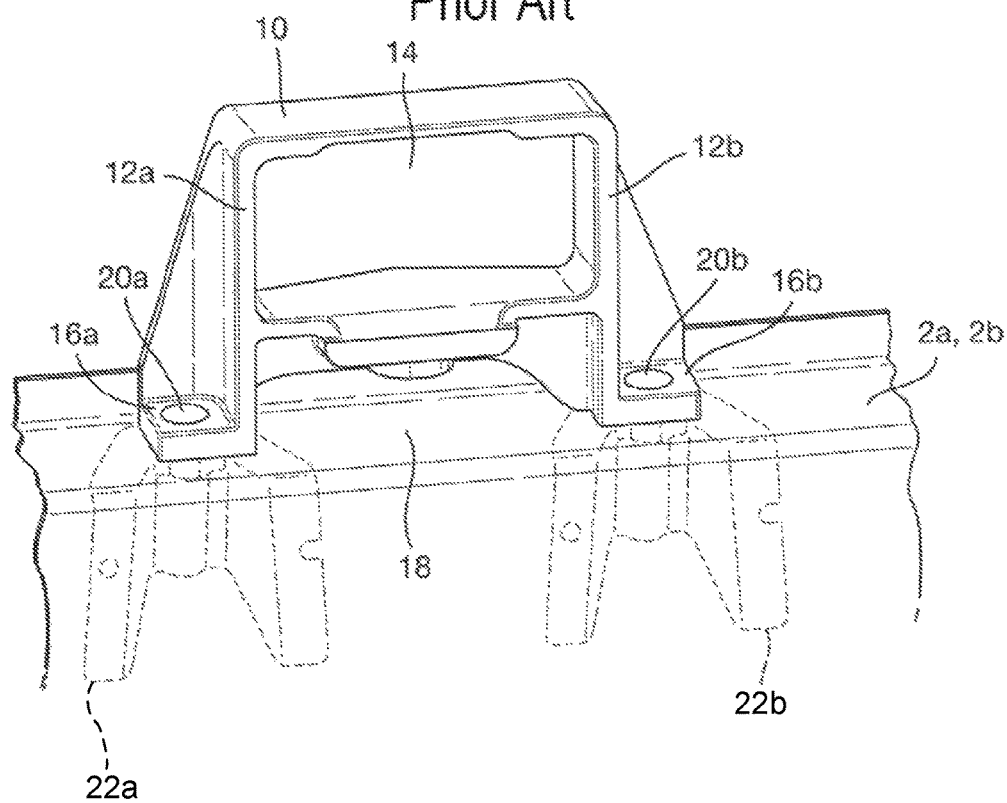
FIG. 2 shows a perspective view of a previously-proposed mounting bracket for a vehicle powertrain.

FIGS. 2-4 show example configurations with relative positioning of the various components, drawn to scale although other relative dimensions may be used, if desired. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated by those skilled in the art that although the invention has been described by way of example, with reference to one or more examples, it is not limited to the disclosed examples and alternative examples may be constructed without departing from the scope of the invention as defined by the appended claims.

The invention claimed is:

1. A powertrain mount assembly configured to connect a powertrain to a side rail of a vehicle frame structure, wherein the powertrain mount assembly comprises:
   a mounting bracket comprising a first side wall, a second side wall, and a top wall, the second side wall spaced apart from the first side wall and the top wall extending between the first side wall and the second side wall, the mounting bracket being configured to receive a resilient member and a bracket arm between the first and second side walls and below the top wall, the bracket arm being connectable to the powertrain, the powertrain including an engine; and
   a first support bracket connectable to a surface of the side rail, wherein the first side wall of the mounting bracket is in fixed and face-sharing contact with a flat side surface of the first support bracket and wherein the first support bracket is configured to be connected to the side rail at a location between the first and second side walls of the mounting bracket.

2. The powertrain mount assembly as claimed in claim 1, wherein the first side wall comprises a first opening for receiving a first fastener such that the first fastener is substantially horizontal when in an installed configuration and the first support bracket comprises a first bore configured to receive the substantially horizontal first fastener.

3. The powertrain mount assembly as claimed in claim 2, wherein the first opening and first bore are arranged in the installed configuration such that the first fastener extends in a direction substantially parallel to a longitudinal axis of the vehicle frame structure.

4. The powertrain mount assembly as claimed in claim 1, wherein the first support bracket is configured to connect to a top surface of the side rail.

5. The powertrain mount assembly as claimed in claim 1, wherein the mounting bracket is provided above a top surface of the side rail.

6. The powertrain mount assembly as claimed in claim 1, wherein the first support bracket comprises:
a bottom surface connectable to the surface of the side rail.

7. The powertrain mount assembly as claimed in claim 1, wherein the first support bracket is configured to be welded to the side rail.

8. The powertrain mount assembly as claimed in claim 1, wherein the mounting bracket comprises a flange connected to the second side wall, wherein the flange comprises a second opening extending through the flange for receiving a second fastener to attach the mounting bracket to the side rail.

9. The powertrain mount assembly as claimed in claim 1, wherein the mounting bracket comprises a cavity for receiving the resilient member and bracket arm, the cavity being provided between the first and second side walls.

10. The powertrain mount assembly as claimed in claim 2, wherein the first fastener is a bolt or stud.

11. A vehicle comprising a powertrain mount assembly configured to connect a powertrain to a side rail of a vehicle frame structure, wherein the powertrain mount assembly comprises a mounting bracket comprising a first side wall, a second side wall, and a top wall, the second side wall spaced apart from the first side wall and the top wall extending between the first side wall and the second side wall, the mounting bracket being configured to receive a resilient member and a bracket arm between the first and second side walls and below the top wall, the bracket arm being connectable to the powertrain; and a first support bracket connectable to a surface of the side rail, wherein the first side wall of the mounting bracket is in fixed and face-sharing contact with a flat side surface of the first support bracket and wherein the first support bracket is configured to be connected to the side rail at a location between the first and second side walls of the mounting bracket, where the powertrain includes an engine.

12. A system, comprising:
a powertrain mount assembly connecting a powertrain to a side rail of a vehicle frame structure, wherein the powertrain mount assembly includes:
a mounting bracket with a first side wall, a second side wall, and a top wall, the second side wall spaced apart from the first side wall and the top wall extending between the first side wall and the second side wall, the mounting bracket receiving a resilient member and a bracket arm between the first and second side walls and below the top wall, the bracket arm being connectable to the powertrain including an engine; and
a first support bracket connectable to a surface of the side rail, wherein the first side wall of the mounting bracket is in fixed and face-sharing contact with a flat side surface of the first support bracket and wherein the first support bracket is connected to the side rail at a location between the first and second side walls of the mounting bracket.

13. The system as claimed in claim 12, wherein the first side wall comprises a first opening for receiving a first fastener such that the first fastener is substantially horizontal when in an installed configuration and the first support bracket comprises a first bore receiving the substantially horizontal first fastener, and wherein the first support bracket is connected to a top surface of the side rail.

14. The system as claimed in claim 13, wherein the mounting bracket is provided above the top surface of the side rail, and wherein the first support bracket comprises:
a bottom surface connectable to the surface of the side rail.

15. The system as claimed in claim 14, wherein the first support bracket is welded to the side rail and wherein the mounting bracket comprises a flange connected to the second side wall, wherein the flange comprises a second opening extending through the flange for receiving a second fastener to attach the mounting bracket to the side rail.

* * * * *